UNITED STATES PATENT OFFICE.

EMIL ZACHARIAS AND EUGEN BERNHARD, OF GRIESHEIM-ON-THE-MAIN, GERMANY, ASSIGNORS TO CHEMISCHE FABRIK, GRIESHEIM ELECTRON, OF FRANKFORT, GERMANY.

PROCESS OF MAKING NITRONAPHTHALENE DERIVATIVES.

SPECIFICATION forming part of Letters Patent No. 675,434, dated June 4, 1901.

Application filed May 29, 1900. Serial No. 18,415. (No specimens.)

*To all whom it may concern:*

Be it known that we, EMIL ZACHARIAS and EUGEN BERNHARD, subjects of the Emperor of Germany, and residents of Griesheim-on-the-Main, Germany, have invented certain new and useful Improvements in the Production of Nitronaphthalene Derivatives, of which the following is a specification.

This invention has for its object the manufacture or production of nitronaphthalene derivatives from 1:4-chloronitronaphthalene and depends on the observation, which has not hitherto been made, that the chlorin atom in 1:4-chloronitronaphthalene can be replaced by the hydroxyl, alkyloxy, amido and alkylamido groups.

Statements regarding the reactivity of the chlorin atom of chloronitronaphthalene are not found in literature. Only in the case of naphthalene derivatives containing four or more substituents have the halogen atoms been replaced by a hydroxyl, alkyloxy, or amido group. Alén replaced a chlorin atom in dinitrodichloronaphthalene, (Ber.,36,434,) Labhardt replaced a bromin atom in trinitrobromonaphthalene, (Ber., 12,680,) Merz and Weith replaced a bromin atom in tetranitrobromonaphthalene, (Ber., 15,2717,) and Cleve replaced a chlorin atom in trinitrodichloronaphthalene, (Ber., 23,957.) We investigated the known chloronitronaphthalenes—that is to say, the 1:4, 1:5, 1:8, and 2:8 compounds—and discovered that the chlorin of 1:4-chloronitronaphthalene only is easily replaced by the hydroxyl, alkyloxy, amido, and alkylamido groups, while under similar conditions the chlorin in the 1:5, 1:8, and 2:8 positions does not react. Sometimes the change takes place on simply boiling 1:4-chloronitronaphthalene with the particular compound. If in certain cases mere boiling is not sufficient or takes too long, the change may be brought about by applying pressure. Thus 1:4-nitronaphthol is obtained by heating 1:4-chloronitronaphthalene under pressure with aqueous solutions of caustic alkalies, acid or neutral, alkali carbonates, or alkali acetates, it being convenient to add a certain amount of alcohol. The formation of the corresponding ether takes place, however, on merely boiling a solution of chloronitronaphthalene in the corresponding alcohol with the theoretical quantity of caustic alkali (one molecular proportion) dissolved in the alcohol or in the smallest possible quantity of water. Furthermore, the corresponding naphthylamin derivatives and alkylnaphthylamin derivatives are produced on heating 1:4-chloronitronaphthalene with ammonia and the corresponding alkylamins likewise under pressure.

The following examples will serve to further explain the process.

Example I: Ten kilos of 1:4-chloronitronaphthalene are heated with a solution of ten kilos of sodium carbonate in a mixture of fifty liters of alcohol with one hundred and fifty liters of water for about twenty hours in autoclaves at from 150° to 155° centigrade, the mixture being agitated meanwhile. Undissolved resinous matter and original material are then filtered off and the naphthol obtained by precipitation with acid. If necessary, it can be recrystallized from water.

Example II: A concentrated solution of 1:9 kilos of caustic soda is allowed to drop gradually into a boiling solution of ten kilos of 1:4-chloronitronaphthalene in fifty liters of alcohol. To complete the reaction, the liquid requires to be boiled for half an hour. After distilling off the spirit the 1:4-nitronaphthol ether separates out along with common salt and is purified by recrystallization from alcohol.

If methyl alcohol be used in the corresponding way instead of ethyl alcohol, 1:4-nitronaphthol methyl ether is obtained, melting at 85° to 86° centigrade.

Example III: Ten kilos of 1:4-chloronitronaphthalene are heated with forty-five liters of an eight-per-cent. solution of alcoholic ammonia in autoclaves for six hours at from 150° to 170° centigrade. On dilution with water the liquid deposits 1:4-nitronaphthylamin, which can, if necessary, be purified by dissolving in dilute hydrochloric acid or by crystallization from benzene. If aqueous ammonia be employed instead of alcohol, the reaction temperature must be raised about 50° centigrade.

Example IV: Ten kilos of 1:4 chloronitronaphthalene are dissolved in fifty liters of alcohol and heated with twenty-five liters of a thirty-three-per-cent. solution of ethylamin in autoclaves for from six to eight hours at 180° centigrade. On cooling, ethyl-1:4-nitronaphthylamin separates in dark-red needles with beautiful blue fluorescence and melting at 176° to 177° centigrade.

Example V: Ten kilos of 1:4-chloronitronaphthalene are dissolved in fifty liters of alcohol and heated with ten kilos of benzylamin in autoclaves for eight hours at 150° centigrade. The benzyl-1:4-nitronaphthylamin which crystallizes out on cooling is freed from benzylamin hydrochlorid by washing with water and after crystallization from benzene melts at 156° centigrade.

We claim—

1. The herein-described process of producing derivatives of nitronaphthalene from 1:4 chloronitronaphthalene which consists in heating the latter with alcohol in aqueous solution of an alkaline hydroxid, whereby the chlorin atom in the chloronitronaphthalene is replaced by a hydroxyl, alkyloxy, amido or alkylamido radical, substantially as herein described.

2. The herein-described process of producing nitronaphthol from 1:4 chloronitronaphthalene which consists in heating the latter with alcohol in aqueous solution of a caustic alkali, substantially as described.

In testimony whereof we have signed our names to this specification in the presence of two subscribing witnesses.

EMIL ZACHARIAS.
EUGEN BERNHARD.

Witnesses:
FRANZ HASSLACHER,
MICHAEL VOLK.